United States Patent [19]
Yoshimura et al.

[11] Patent Number: 5,123,020
[45] Date of Patent: Jun. 16, 1992

[54] PHASE SYNCHRONIZATION PULL-IN SYSTEM IN BIT ERROR DETECTING APPARATUS

[75] Inventors: Junichi Yoshimura, Hino; Atsuhiko Utsumi, Tachikawa, both of Japan

[73] Assignee: Fujitsu Limited, Kawasaki, Japan

[21] Appl. No.: 494,474

[22] Filed: Mar. 16, 1990

[30] Foreign Application Priority Data

Mar. 17, 1989 [JP] Japan .................. 1-065365
Feb. 14, 1990 [JP] Japan .................. 2-031537

[51] Int. Cl.⁵ .................. G06F 15/40; H04L 1/00
[52] U.S. Cl. .................. 371/68.1; 371/5.4
[58] Field of Search .................. 371/68.1, 62, 5.4, 5.1

[56] References Cited

U.S. PATENT DOCUMENTS

| | | | |
|---|---|---|---|
| 3,720,819 | 3/1973 | Newton et al. | 371/68.1 |
| 4,188,615 | 2/1980 | Tan | 371/4 |
| 4,713,621 | 12/1987 | Nakamura et al. | 328/55 |
| 4,727,592 | 2/1988 | Okada et al. | 455/601 |
| 4,747,105 | 5/1988 | Wilson et al. | 371/5.4 |
| 4,788,670 | 11/1988 | Hofmann et al. | 371/68.1 |
| 4,806,852 | 2/1989 | Swan et al. | 371/62 |
| 4,939,736 | 7/1990 | Kocan | 371/68.1 |
| 4,961,013 | 10/1990 | Obermeyer, Jr. et al. | 307/480 |

FOREIGN PATENT DOCUMENTS

1-175332 11/1989 Japan .
314447 12/1989 Japan .................. 371/5.4

*Primary Examiner*—Stephen M. Baker
*Assistant Examiner*—Phung Chung
*Attorney, Agent, or Firm*—Staas & Halsey

[57] ABSTRACT

A phase synchronization pull-in system used in a bit error detecting apparatus includes a monitored circuit for inputting an input signal and processing the input signal when an operation of the monitored circuit is to be monitored, a standard circuit for processing an output of the monitored circuit inversely to the processing in the monitored circuit, a phase synchronization circuit for inputting the input signal of the monitored circuit and adjusting a first delay time of the input signal so that the first delay time coincides with a second delay time of the output of the standard circuit corresponding to the input signal, a bit error detecting circuit for detecting a difference between the input signal, after being delayed through a variable delay circuit, and the output of the standard circuit, bit by bit, and a controller for controlling the adjusting of the first delay time, a monitoring operation, and a phase synchronization pull-in operation. In the phase synchronization pull-in operation, the first delay time is obtained in the phase synchronization circuit based on whether or not a bit error rate measured by setting the delay time is higher than a predetermined value. The controller determines whether or not more than one possible value of the first delay time enables a successful phase synchronization pull-in, and carries out the monitoring operation when a successful phase synchronization pull-in is successfully carried out for only one value of the first delay time.

10 Claims, 13 Drawing Sheets

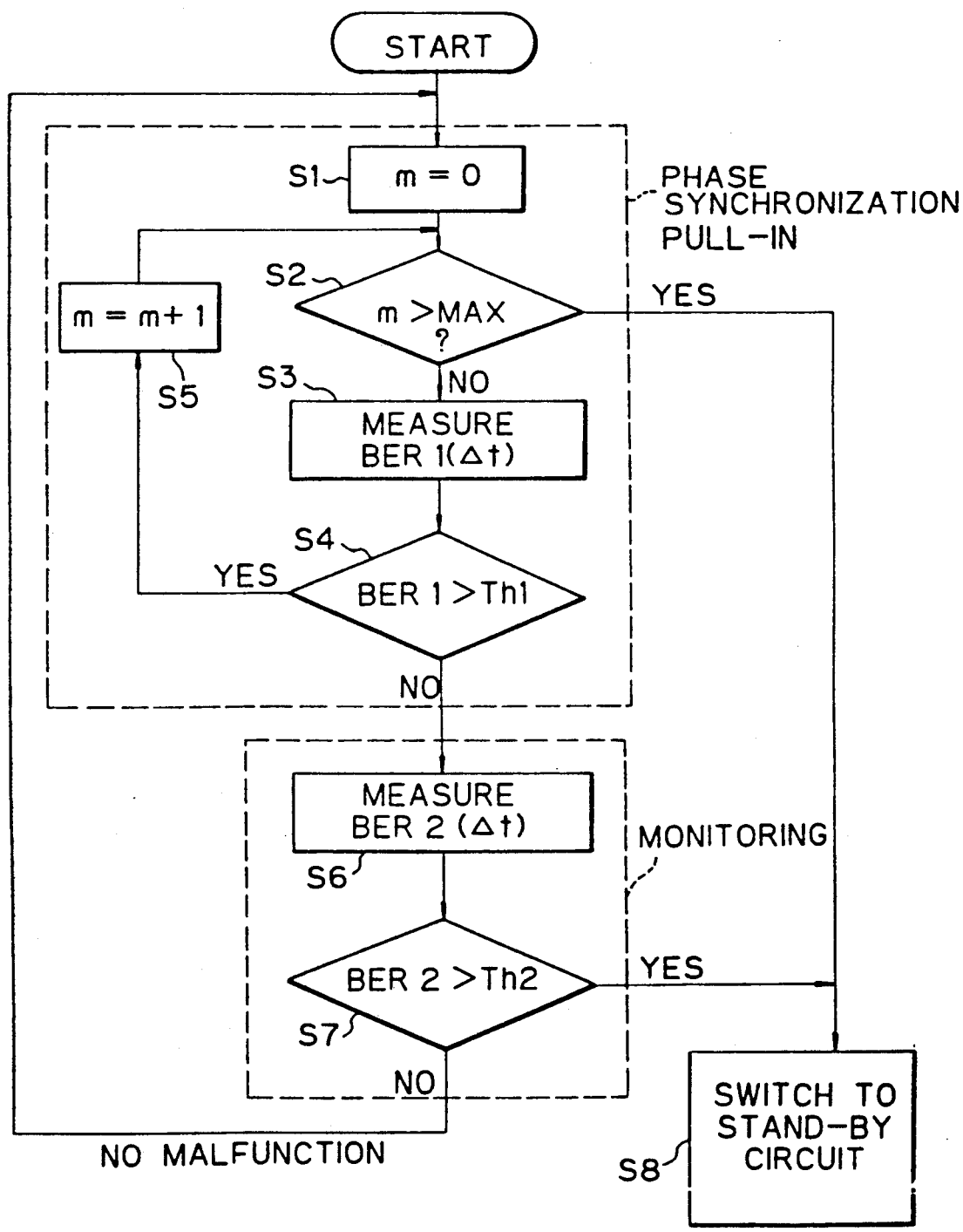

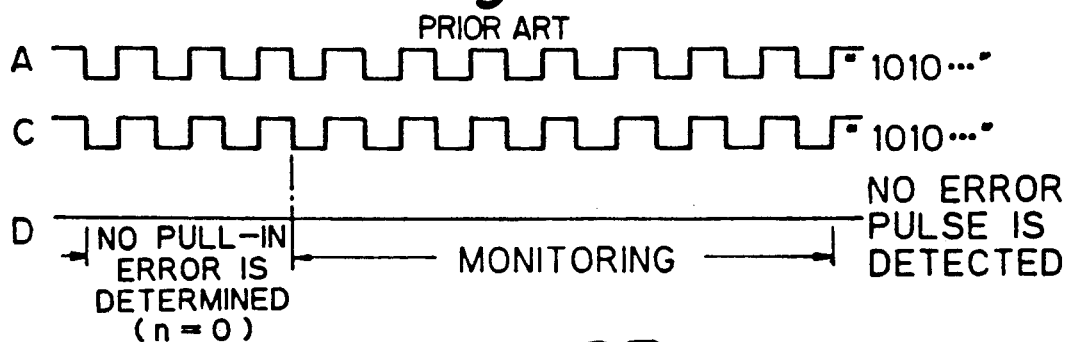
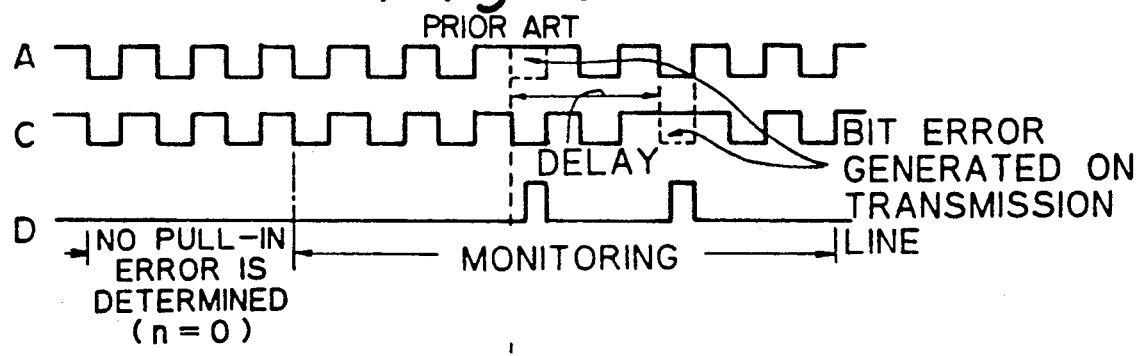
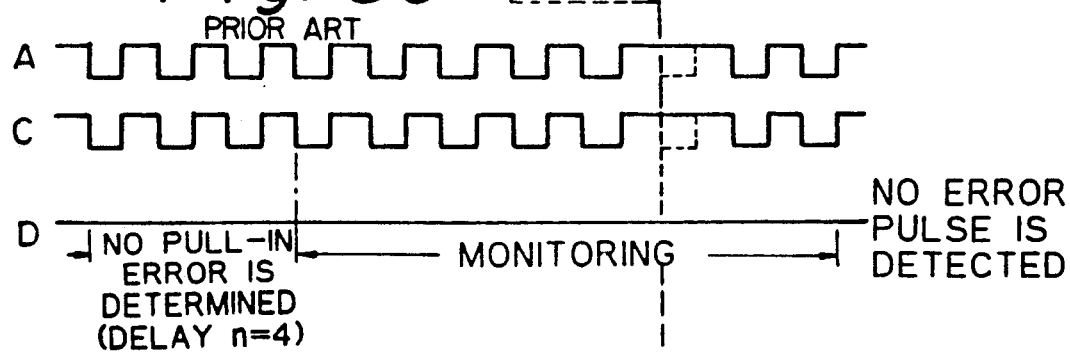
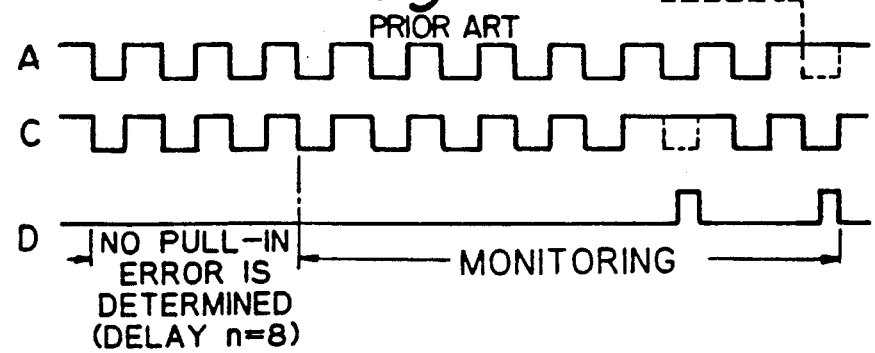

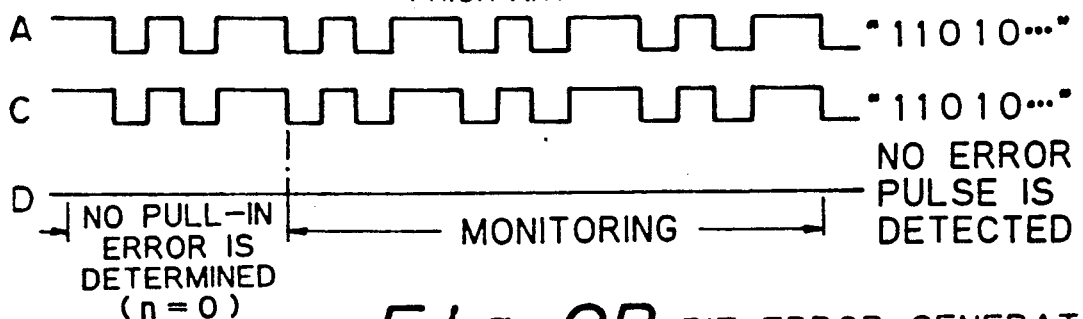
Fig. 9A PRIOR ART
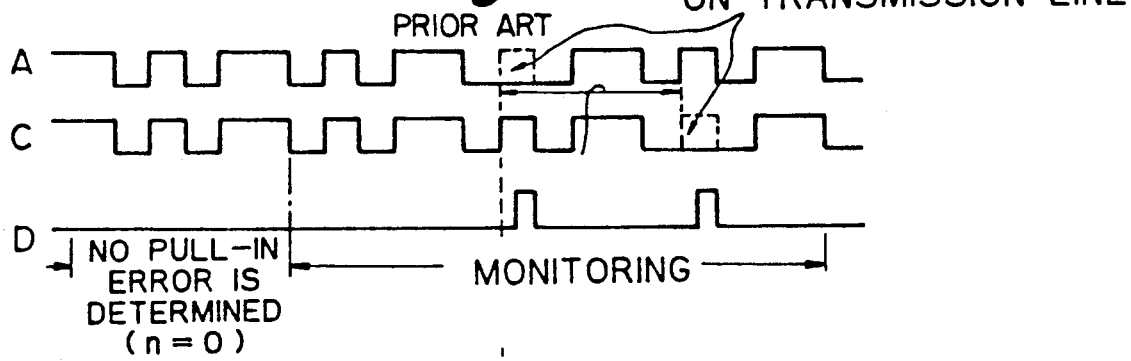
Fig. 9B BIT ERROR GENERATED ON TRANSMISSION LINE
PRIOR ART
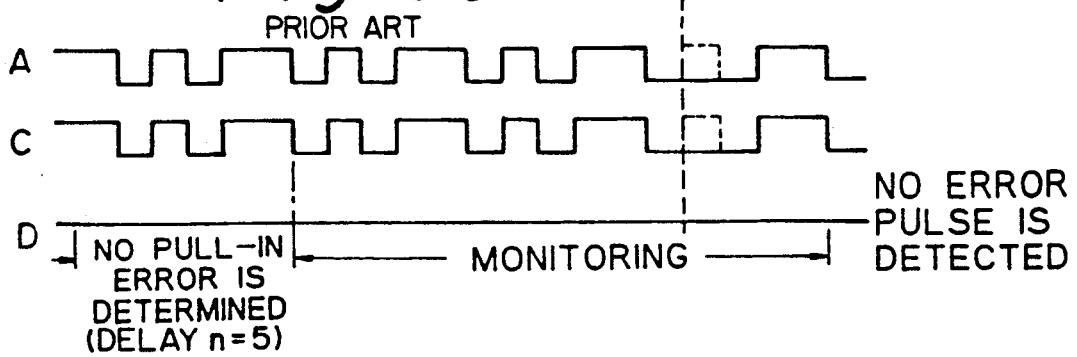
Fig. 9C (+5 BITS DELAYED)
PRIOR ART
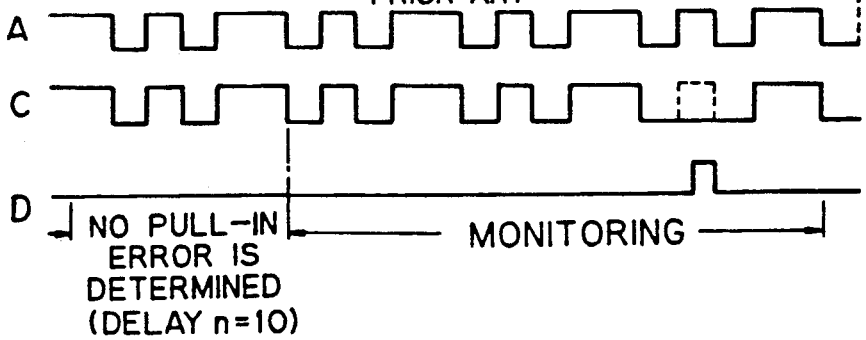
Fig. 9D (+5 BITS DELAYED)
PRIOR ART

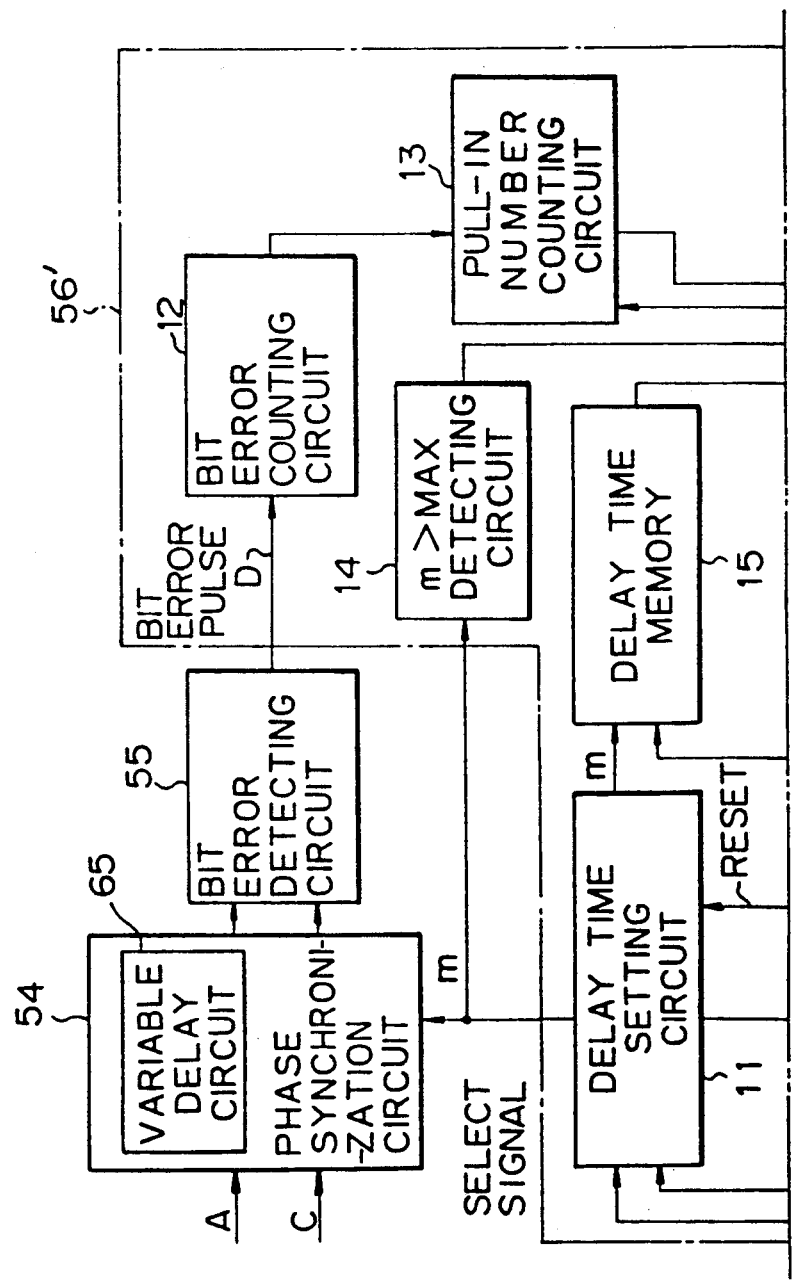

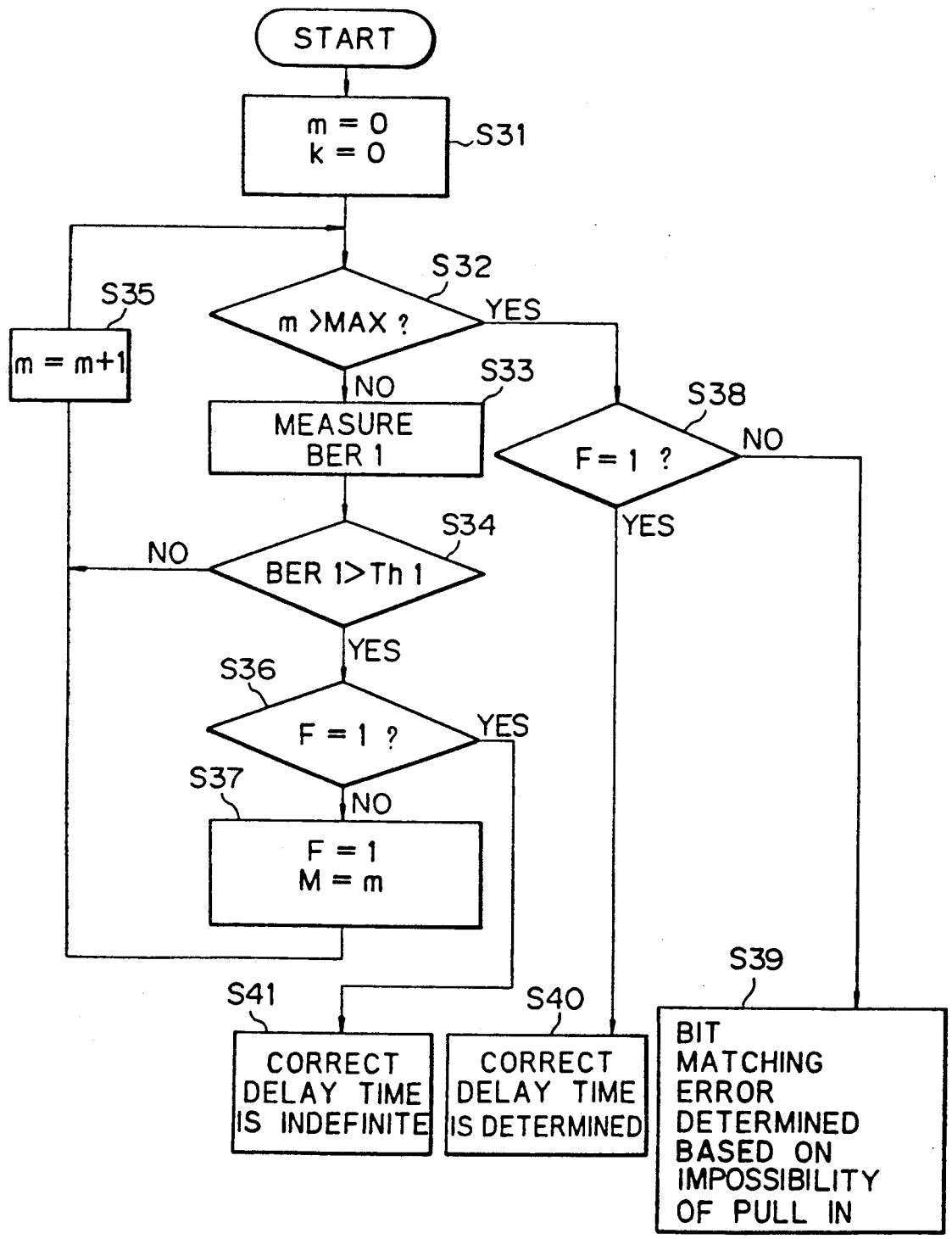

PHASE SYNCHRONIZATION PULL-IN SYSTEM IN BIT ERROR DETECTING APPARATUS

BACKGROUND OF THE INVENTION (1) Field of the Invention

The present invention relates to a phase synchronization pull-in system which is used in a bit error detecting apparatus.

Bit error detecting apparatuses are provided in digital communication systems for monitoring a malfunction in an apparatus which is used in the digital communication system. The apparatus which is monitored is, for example, a multiplexer, a demultiplexer, a coder, a decoder, or the like. The bit error detection is carried out by inversely processing the output of the apparatus being monitored so that the corresponding input is obtained when the apparatus functions normally, and comparing the inversely processed result with a corresponding actual input of the apparatus. To carry out the above inverse processing, a standard circuit which is assumed to operate normally is provided.

Further, to obtain the above correspondence between the above actual input signals of the apparatus and the corresponding output signals of the standard circuit, phases of the actual input signals of the apparatus and the corresponding output signals of the standard circuit need to be synchronized. An operation for obtaining information for the phase synchronization is carried out before a monitoring cycle, and is called phase synchronization pull in.

(2) Description of the Related Art

FIG. 1 is a block diagram of a data processing apparatus for monitoring its own main function using bit error detection.

In FIG. 1, reference numeral 50 denotes a data processing apparatus, for example, a digital transmission terminal apparatus, 51 denotes a circuit which is subject to monitoring of its own function, 52 denotes a standard circuit which carries out an inverse processing to the processing in the circuit 50, 53 denotes a bit matching circuit, 54 denotes a phase synchronization circuit, 55 denotes a bit error detecting circuit, 56 denotes a controller, and 57 and 58 denote transmission lines, respectively connected to input and output sides of the circuit 51. When the circuit 51 is a multiplexer, the standard circuit is a demultiplexer, and when the digital transmission terminal apparatus 50 has a stand-by construction (not shown) for its own currently operating construction, a demultiplexer in the stand-by construction can be used.

A signal A which contains a plurality of channels and is transmitted through the transmission line 57, is input into the circuit (multiplexer) 51, and is multiplexed, and the output B of the multiplexer 51 is transmitted out onto the transmission line 58. To monitor the operation of the multiplexer 51, the output B of the multiplexer 51 is also input into the standard circuit (demultiplexer) 52, and is demultiplexed. A signal C of a selected channel of the demultiplexed signal B, is input into the bit matching circuit 53 together with a signal of the same channel in the input signal A. Although not shown, selectors are used for the above selections of the channel, respectively. If a phase synchronization pull-in operation is impossible, the inputs of the bit matching circuit 53 may be changed to another channel.

Generally, the circuit 51 and the standard circuit 52 are formed by various digital circuit components such as flip-flop circuits, and a delay is generated through the circuit 51 and the standard circuit 52. As mentioned before, to carry out the bit error detection, correspondence between the inputs of the bit matching circuit 53 must be obtained, i.e., phases of the actual input signals of the phases of the circuit 51 and the corresponding output signals of the standard circuit 52 need to be synchronized.

To synchronize the above signals, a phase synchronization circuit 54 is provided in the first stage of the bit matching circuit 53. After the phases of the input signals are synchronized, the input signals are compared bit by bit, and a difference between the corresponding bits in the input signals, is detected as a bit error in the bit error detecting circuit 55. The aforementioned phase synchronization pull-in operation, and the monitoring of the circuit 51 following the phase synchronization pull-in, are carried out using the phase synchronization circuit 54 and the bit error detecting circuit 55 under the control of the controller 56, as explained later. The controller 56 controls the switching from the currently operating system to the stand-by system, based on the result of the monitoring.

FIG. 2 is a block diagram of the phase synchronization circuit 54 and the bit error detecting circuit 55 shown in FIG. 1.

In FIG. 2, reference numerals 61 and 62 each denote a flip-flop circuit, 63 denotes an elastic memory, 64 denotes a fixed delay circuit, 65 denotes a variable delay circuit, 66 denotes an exclusive OR circuit, 67 denotes a flip-flop circuit, and 68 denotes an AND circuit.

The above-mentioned input signal A is input into the flip-flop circuit 61 at the timing of a clock signal CLKA, which is extracted from the signal A on the transmission line 57. The Q output of the flip-flop circuit 61 is applied to the variable delay circuit 65 through the fixed delay circuit 64. Then, the signal A is further delayed through the variable delay circuit 65, and the output of the variable delay circuit 65 is input into one input terminal of the exclusive OR circuit 66 in the bit error detecting circuit 55.

The above-mentioned output signal C of the standard circuit 52 is input into the flip-flop circuit 62 at the timing of a clock signal CLKC, which is extracted from the signal C. The delay time in the delay circuit 64 is predetermined based on the aforementioned delay in the circuit 51 and the standard circuit 52, and the delay in the elastic memory 63. The output of the elastic memory 63 is input into the other terminal of the exclusive OR circuit 66.

The Q output of the flip-flop circuit 62 is applied to the variable delay circuit 65 through the elastic memory 63. The Q output of the flip-flop circuit 62 is written in the elastic memory 63 at the timing of the clock signal CLKC, and is read out therefrom at the timing of the clock signal CLKA. Namely, each bit of the signal C is applied to the exclusive OR circuit 66 after being synchronized with the clock signal CLKA.

FIG. 3 shows a construction of the variable delay circuit 65.

In FIG. 3, reference numeral 71 denotes a selector, and 72 denotes a shift register formed by a plurality of flip-flop circuits FF1 to FFn.

The output of the elastic memory 63 is applied to the flip-flop circuit FF1 of the first stage, and the clock signal CLKA is applied to edge triggered input terminals of all the flip-flop circuits FF1 to FFn. The above output of the elastic memory 63, and Q outputs of all the flip-flop circuits FF1 to FFn are respectively applied to n+1 input terminals of the selector 71. These terminals are respectively denoted by "0" to "n". The selector 71 selects one of these inputs as its output in accordance with a select signal from the controller 56. Thus, the delay time in the variable delay circuit 65 can be controlled by the select signal, so that phases of each bit of the signal A through the fixed delay circuit 64 and the variable delay circuit 65, and a corresponding bit of the signal C through the circuit 51, the standard circuit 52, the flip-flop circuit 62, and the elastic memory 63, are synchronized with each other at the exclusive OR circuit 66 in the bit error detecting circuit 55.

In the construction of FIG. 2, the output of the exclusive OR circuit 66 is "0" when both the inputs of the exclusive OR circuit 66 match, is "1" when the inputs are different from each other, and is applied to the data input terminal of the flip-flop circuit 67. The clock signal CLKA is applied to the edge triggered input terminal of the flip-flop circuit 67. Thus, the Q output, which is synchronized with the clock signal CLKA, is "0" when both the inputs of the exclusive OR circuit 66 match, is "1" when the inputs are different from each other and is input into one input terminal of the AND circuit 68. The clock signal CLKA is applied to the other input terminal of the AND circuit 68, and thus, a pulse having a width of a half cycle of the clock signal CLKA, is output as a bit error pulse from the AND circuit 68 every cycle the input bits of the exclusive OR circuit 66 indicate the same values.

FIG. 4 is a flow chart of a control procedure of the controller 56 for phase synchronization pull-in and bit error detection in the prior art.

In the step S1 of FIG. 4, first, the delay in the variable delay circuit 65, which is indicated by the number "m" (m=0−n) of the selected input terminal in the variable delay circuit 65, is set to zero by the select signal.

In the step S2, it is determined whether or not the delay in the variable delay circuit 65 exceeds the maximum delay in the variable delay circuit 65. When it is determined NO, the operation goes to the step S3, and a bit error rate BER1 is measured for a predetermined time $\Delta t$. Then, in the step S4, it is determined whether or not the bit error rate BER1 is larger than a threshold value Th1 (for example, $10^{-3}$). When it is determined YES, the operation goes to the step S5, and the delay in the variable delay circuit 65 is incremented by one cycle of the clock signal CLKA as m→m+1. Then, the operations of steps S2 to S5 are repeated until it is determined that the bit error rate BER1 measured in the step S3 is equal to or smaller than the threshold value Th1.

When it is determined NO in the step S4, i.e., it is determined that the bit error rate BER1 measured in the step S3 is equal to or smaller than the threshold value Th1, it is determined that the phase synchronization pull-in is completed, and the operation goes to the step S6 to start monitoring the operation of the circuit 51. In the step S6, a bit error rate BER2 is measured for a predetermined time $\Delta T$ (where $\Delta T > \Delta t$). Then, in the step S7, it is determined whether or not the bit error rate BER2 is larger than a threshold value Th2 (for example, $10^{-6}$). When it is determined NO in the step S7, it is determined that the operation of the circuit 51 is normal, and the operation goes to the step S1 for carrying out a phase synchronization pull-in operation and a monitoring operation for another channel or another circuit, and the operations of the steps S1 to S7 are repeated.

When it is determined YES in the step S2, it is determined that the phase synchronization pull-in is impossible for the circuit 51, the operation goes to the step S8, and the operation is switched from the circuit 51 to a stand-by circuit for the circuit 51.

When it is determined YES in the step S7, it is determined that a malfunction has occurred in the circuit 51, the operation goes to the step S8, and the operation is switched from the circuit 51 to a stand-by circuit for the circuit 51.

FIGS. 5A to 5C are timing diagrams of the operation of the circuit in FIGS. 1 to 3.

In FIGS. 5A to 5C, reference A, C, CLKA, and D respectively denote the same signals in the circuit of FIGS. 1 to 3, and Q67 denotes the Q output of the flip-flop circuit 67 of FIG. 2.

FIG. 5A is a timing diagram of an operation when the phase of the input signal A in the exclusive OR circuit 66 precedes the other input signal C by two bits (two cycles of the clock signal CLKA). FIG. 5B is a timing diagram of an operation when the phase of the input signal A in the exclusive OR circuit 66 precedes the other input signal C by one bit (one cycle of the clock signal CLKA). FIG. 5C shows an operation when the phase of the input signal A in the exclusive OR circuit 66 coincides to with the other input signal C.

As shown in FIGS. 5A and 5B, when the phases of the input signals A and C in the exclusive OR circuit 66 differ from each other, usually, the output D of the bit error detecting circuit 55 contains the aforementioned bit error pulse, and thus the bit error rate is increased. On the other hand, as shown in FIG. 5C, when the phases of the input signals A and C in the exclusive OR circuit 66 coincide with each other, the output D of the bit error detecting circuit 55 does not contain the aforementioned bit error pulse, and thus the bit error rate is not increased as long as the circuit being monitored operates normally.

However, in communication systems, a signal consisting of all ."1"'s may be transmitted as an alarm indication signal AIS which indicates an occurrence of an alarm state.

FIGS. 6A to 6D are timing diagrams of the conventional control operations of FIG. 4 when an alarm indication signal AIS is successively input from the transmission line 57.

In FIGS. 6A to 6D, reference letters A, C, and D respectively denote the signals which are the same in FIGS. 5A to 5C.

FIG. 6A is a timing diagram when the signal transmitted on the transmission line 57 includes no bit error through the phase synchronization pull-in and monitoring operations. FIGS. 6B to 6D are timing diagrams when the signal transmitted on the transmission line 57 includes no bit error through the phase synchronization pull-in operation, but the signal transmitted on the transmission line 57 includes a bit error during the monitoring operation.

As shown in FIG. 6A, when the signal transmitted on the transmission line 57 includes no bit error through the phase synchronization pull-in and monitoring operations, the bit error rate is zero regardless of the setting of the delay time in the variable delay circuit 65. Namely, the determination in the step S6 is NO regardless of the setting of the delay time in the variable delay circuit 65, and therefore, by the procedure of FIG. 4, it is impossible to know whether or not a correct delay time setting is performed, i.e., the correct delay time is indefinite, as long as the alarm indication signal AIS is used as a signal in the operation.

Further, the phase synchronization pull-in operations are carried out for a shorter time than the period of monitoring, and the threshold value Th1 used in the phase synchronization pull-in operation, is higher than the threshold value Th2 used in the monitoring operation. As shown in FIGS. 6B and 6D, when the delay time setting is incorrectly carried out, the signal transmitted on the transmission line 57 may include no bit error during the short measuring period in the phase synchronization pull-in operation. But, the signal transmitted on the transmission line 57 may include a bit error during the long measuring period in the monitoring operation. Further, generally, the bit error rate BER1 in the phase synchronization pull-in operation may lower than the high threshold value Th1, but the bit error rate BER2 in the phase synchronization pull-in operation may be higher than the low threshold value Th2. In these cases, a normal circuit may be incorrectly determined as a malfunction due to a bit error which is generated on the transmission line, when the delay time setting is incorrectly carried out as shown in FIGS. 6B and 6D.

FIG. 7 is a flow chart of another conventional control procedure of the controller 56 for phase synchronization pull-in and bit error detection, which is provided to solve the above problem regarding the alarm indication signal AIS, and is disclosed in Japanese Unexamined Patent Publication No. 1-175332.

In the step S51 of FIG. 7, the aforementioned phase synchronization pull-in operation in the steps S1 to S5 of FIG. 4, is carried out. In the step S53, it is determined whether or not the phase synchronization pull-in is impossible in the process of FIG. 4. When it is determined impossible, the operation goes to the step S60. The operation of the step S60 in FIG. 7 is the same as the step S8 of FIG. 4.

When it is determined that phase synchronization pull-in is possible in the step S53 of FIG. 7, i.e., it is determined NO in the step S4 of FIG. 4, the operation goes to the step S54 of FIG. 7, instead of the step S6 of FIG. 4. In the step S54, the delay time setting in the variable delay circuit 65 is shifted by at least one cycle of the clock signal CLKA, for example, as m→m+1. Then a phase synchronization pull-in operation is carried out again for the delay time m+1. Next, in the step S55, it is determined whether or not the above phase synchronization pull-in in the step S54 is successfully carried out by the above shifted delay m+1.

When it is determined NO (impossible) in the step S55, it is determined that the signal on the transmission line is an alarm indication signal AIS, and no following monitoring operation is carried out. Then the operation goes to the step S51 of FIG. 7 (S1 of FIG. 4) for a signal in another channel.

When it is determined YES (possible) in the step S55, it is determined that the signal on the transmission line is not an alarm indication signal AIS, the operation goes to the step S56, and the delay time setting is shifted back to the delay time before the step S54. Then, in the step S57 of FIG. 7 (S6 of FIG. 4), the following monitoring operation is carried out, and the operations of the step 57 and after are the same as the corresponding operations in FIG. 4.

According to the procedure of FIG. 7, an alarm indication signal AIS can be detected before carrying out a monitoring operation using an incorrect delay time which is obtained through the phase synchronization pull-in operation in FIG. 4. The above incorrect determination as a malfunction for a normal circuit can be avoided regarding the alarm indication signal AIS.

However, generally, in communication systems, signals each consisting of a cyclic pattern are used.

FIGS. 8A to 8D, and 9A to 9D are timing diagrams for the circuits in FIGS. 1 to 3, when some signals each consisting of a cyclic pattern are used in the phase synchronization pull-in and monitoring operation.

In the example of FIGS. 8A to 8D, a signal consisting of an alternating pattern "1010 . . . " is used in the bit error detecting operation.

FIG. 8A is a timing diagram when the phase of the input signal A differs from the phase of the input signal C by 2r cycles of the clock signal CLKA at the exclusive OR circuit 66, where r is an arbitrary integer, and no error bit is included in the signal on the transmission line 57.

As shown in FIG. 8A, even when the phase of the input signal A differs from the phase of the input signal C by 2r cycles of the clock signal CLKA at the exclusive OR circuit 66. No bit error pulse appears in the signal D in the case of FIG. 8A, and therefore, the correct delay time cannot be determined, i.e., the correct delay time is indefinite, by the phase synchronization pull-in procedure of the steps S1 to S5 of FIG. 4.

FIG. 8C is a timing diagram where the phases of the input signals A and C coincide with each other at the exclusive OR circuit 66, and an error bit is included in the signal on the transmission line 57.

FIGS. 8B and 8D are timing diagrams where the phase of the input signal A differs from the phase of the input signal C by +4 and −4 cycles of the clock signal CLKA at the exclusive OR circuit 66, respectively, and a error bit is included in the signal on the transmission line 57.

Similar to the cases of FIGS. 6B and 6D, the error bit may not be included in the signal on the transmission line 57 during the phase synchronization pull-in operation, or the bit error rate may be lower than the high threshold value Th1 in the phase synchronization pull-in operation. However, the bit error rate may be higher than the low threshold value Th2 in the monitoring operation. Namely, incorrect delay time setting results in a false determination that a malfunction has occurred in the circuit being monitored, when the bit error rate is between the threshold values Th1 and Th2.

In the example of FIGS. 9A to 9D, a signal consisting of an alternating pattern "11010 . . . ", and having a recurring cycle of five bits, is used in the bit error detecting operation.

FIG. 9A is a timing diagram where the phase of the input signal A differs from the phase of the input signal C by 5r cycles of the clock signal CLKA at the exclusive OR circuit 66, where r is an arbitrary integer. The error bit is included in the signal on the transmission line 57.

As shown in FIG. 9A, even when the phase of the input signal A differs from the phase of the input signal C by 5r cycles of the clock signal CLKA at the exclusive OR circuit 66, no bit error pulse appears in the signal D in the case of FIG. 9A. Therefore, the correct delay time cannot be determined, i.e., the correct delay time is indefinite, by the phase synchronization pull-in procedure of the steps S1 to S5 of FIG. 4

FIG. 9C is a timing diagram where the phases of the input signals A and C coincide with each other at the exclusive OR circuit 66, and an error bit is included in the signal on the transmission line 57.

FIGS. 9B and 9D show the cases where the phase of the input signal A differs from the phase of the input signal C by +4 and −4 cycles of the clock signal CLKA at the exclusive OR circuit 66, respectively, and an error bit is included in the signal on the transmission line 57.

Similar to the cases of FIGS. 6B and 6D, and FIGS. 8B and 8D, the error bit may not be included in the signal on the transmission line 57 during the phase synchronization pull-in operation, or the bit error rate may be lower than the high threshold value Th1 in the phase synchronization pull-in operation. However, the bit error rate may be higher than the low threshold value Th2 in the monitoring operation. Namely, incorrect delay time setting results in a false determination that a malfunction has occurred in the circuit being monitored, when the bit error rate is between the threshold values Th1 and Th2.

SUMMARY OF THE INVENTION

An object of the present invention is to provide a phase synchronization pull-in system which is used in a bit error detecting apparatus, all possible incorrect phase synchronization pull-in operations can be determined, and a false determination that a malfunction has occurred in the circuit being monitored, can be avoided.

According to the present invention, there is provided a phase synchronization pull-in system which is used in a bit error detecting apparatus, comprising a monitored circuit for inputting an input signal and processing the input signal, when an operation of the monitored circuit is to be monitored; a standard circuit for processing on an output of the monitored circuit inversely to the processing in the monitored circuit; a phase synchronization circuit for inputting the input signal of the monitored circuit, and adjusting a first delay time of the input signal so that the first delay time coincides with a second delay time of the output of the standard circuit corresponding to the input signal, the input signal suffers the second delay time through the monitored circuit and the standard circuit; a bit error detecting circuit for detecting a difference between the input signal after being delayed through the variable delay circuit, and the output of the standard circuit, bit by bit; and a controller for controlling the adjusting of the first delay time, a monitoring operation of the monitored circuit, and a phase synchronization pull-in operation, using the phase synchronization circuit and the bit error detecting circuit. Where phase synchronization pull-in operation is an operation for obtaining the first delay time which coincides with the second delay time of the output of the standard circuit corresponding to the input signal, in the phase synchronization circuit, based on whether or not a bit error rate measured by setting the delay time is higher than a predetermined value. The first delay time in the phase synchronization circuit can be changed within a predetermined range between a maximum value which is larger than an estimated maximum amount of the second delay time, and a minimum delay value which is less than an estimated minimum amount of the second delay time. In the phase synchronization pull-in operation, the controller determines whether or not more than one among all possible values of the first delay time enable a successful phase synchronization pull-in, and carries out the monitoring operation when a successful phase synchronization pull-in is successfully carried out for only one among all possible values of the first delay time.

When a recurring cycle of patterns included in the input signal is less than the predetermined range of the phase synchronization circuit, the phase synchronization pull-in operation, based on whether or not a bit error rate measured by setting the delay time is higher than a predetermined value, will be successfully carried out for more than one value of the first delay time. Thus, an incorrect delay time setting which is different from a correct value by the above recurring cycle, can be avoided.

BRIEF DESCRIPTION OF THE DRAWINGS

FIG. 4 is a flow chart of a conventional control procedure of the controller 56 for phase synchronization pull-in and bit error detection;

FIGS. 8A to 8D, and 9A to 9D are timing diagrams of the operations of the circuits in FIGS. 1 to 3, when some signals each consisting of a cyclic pattern are used in the phase synchronization pull-in and monitoring operation;

FIGS. 10A and 10B are block diagrams of the controller 56' in the bit matching circuit 53 according to a first embodiment of the present invention;

FIG. 13 is a flow chart of a control procedure in the second embodiment of the present invention.

DESCRIPTION OF THE PREFERRED EMBODIMENTS

The embodiments of the present invention, are applied to the construction of a data processing apparatus for monitoring its own main function using bit error detection.

Figure 10B:
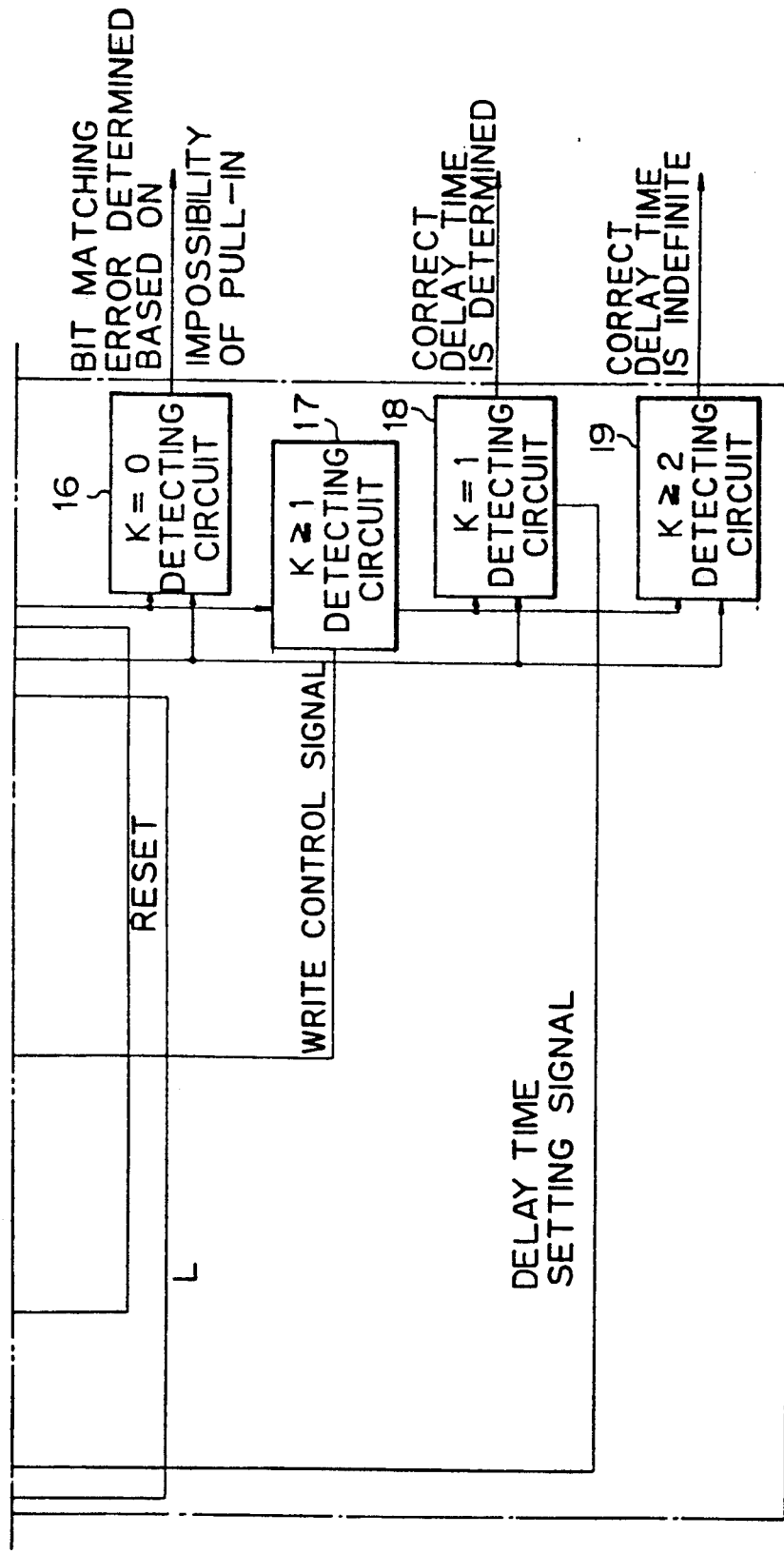

FIGS. 10A and 10B are block diagrams of the controller 56' in the bit matching circuit 53 according to a first embodiment of the present invention. Detail is shown only regarding the construction for the phase synchronization pull-in operation in the controller 56' since the characteristic features of the embodiment of the present invention exist therein.

Figure 1:
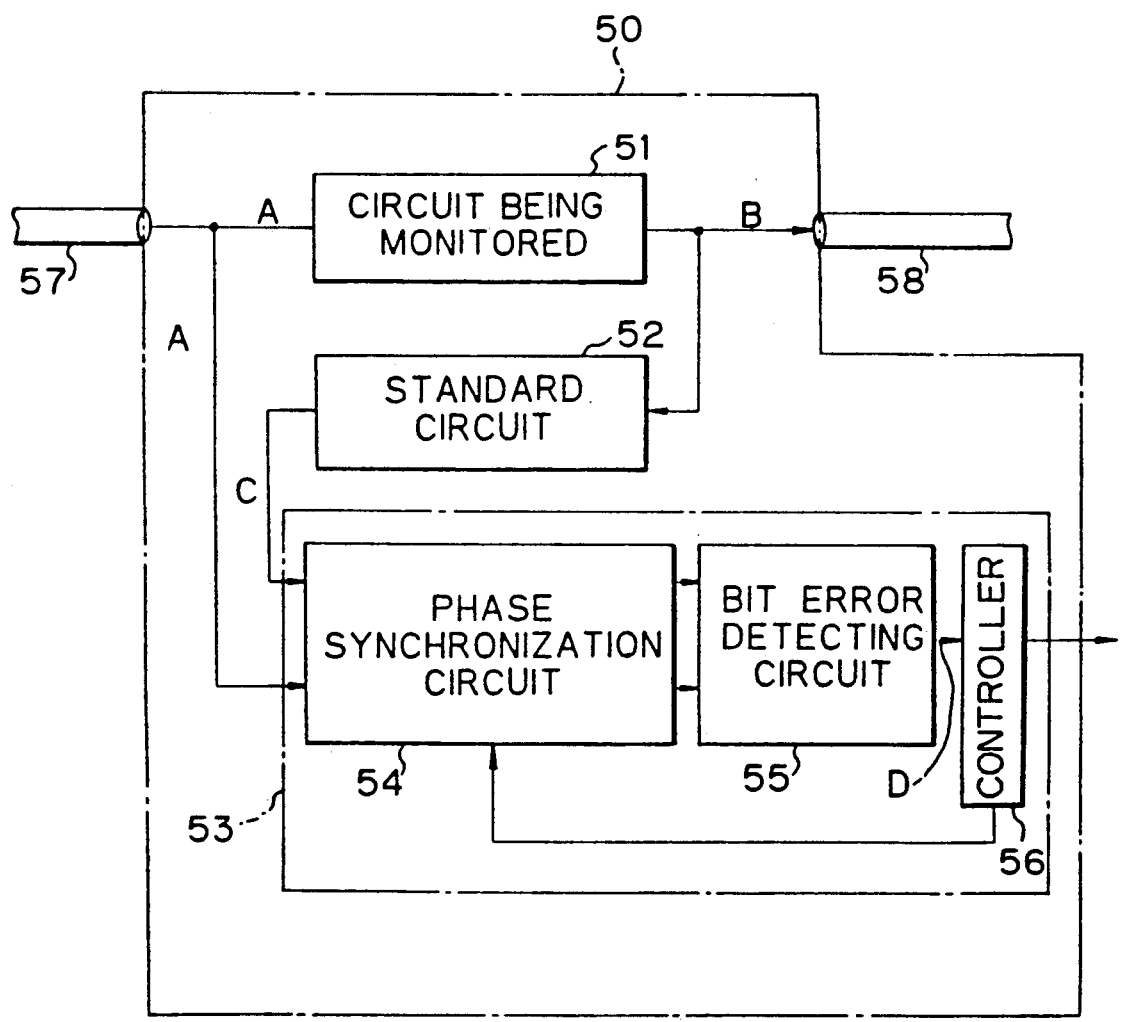
FIG. 1 is a block diagram of a data processing apparatus comprising a construction for monitoring its own main function using bit error detection.
Figure 2:
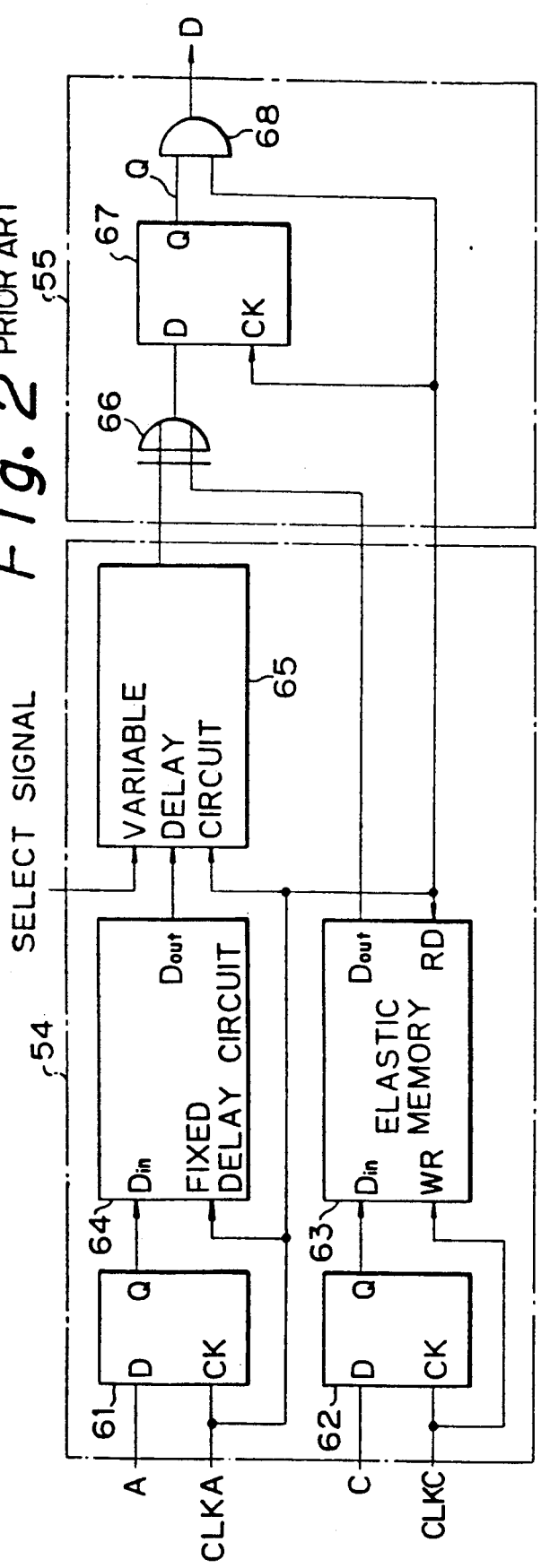
FIG. 2 is a block diagram of the phase synchronization circuit 54 and the bit error detecting circuit 55 of FIG. 1.
Figure 3:
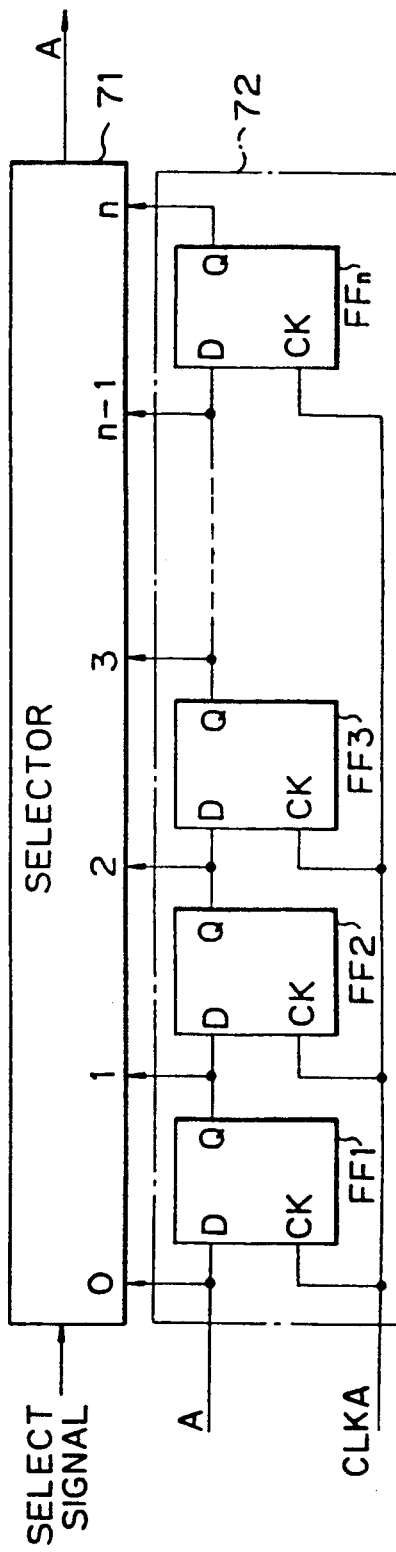
FIG. 3 is a block diagram of the variable delay circuit 65.
Figure 5A:
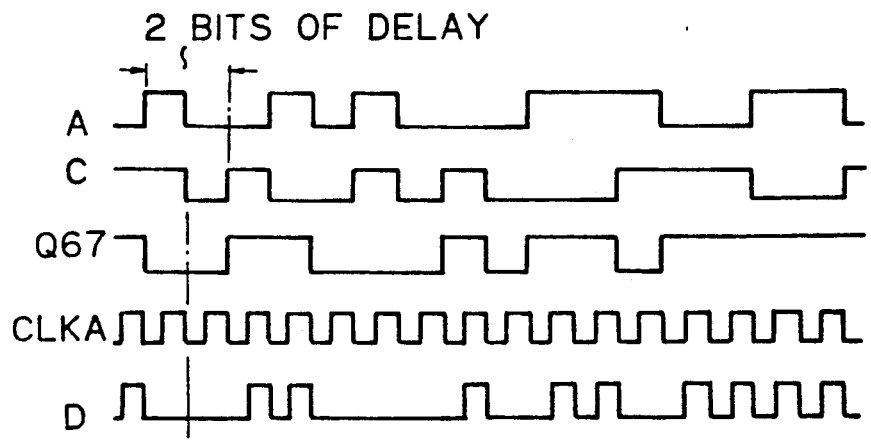
FIGS. 5A to 5C are timing diagram of the operation of the circuits of FIGS. 1 to 3.
Figure 5B:
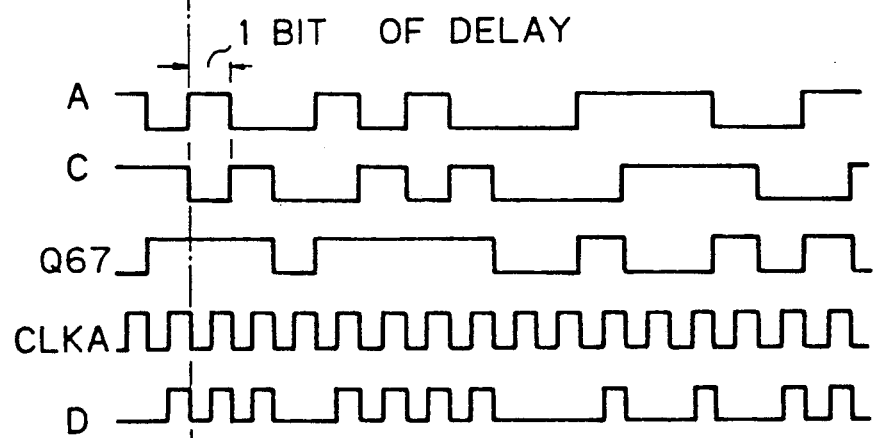
Figure 5C:
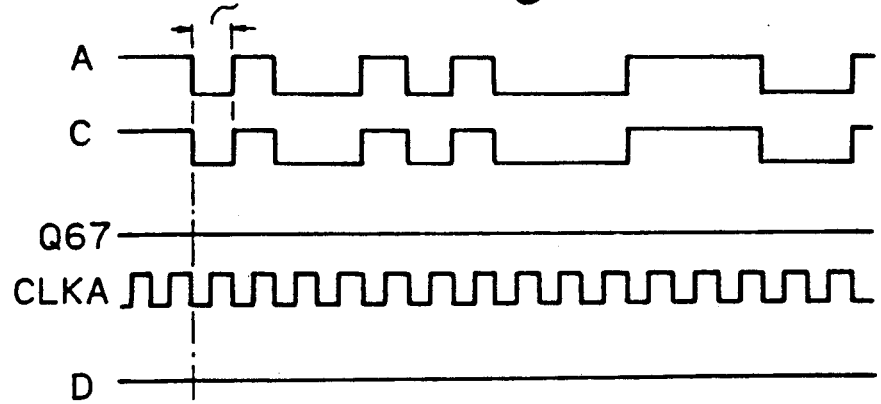
Figure 6A:
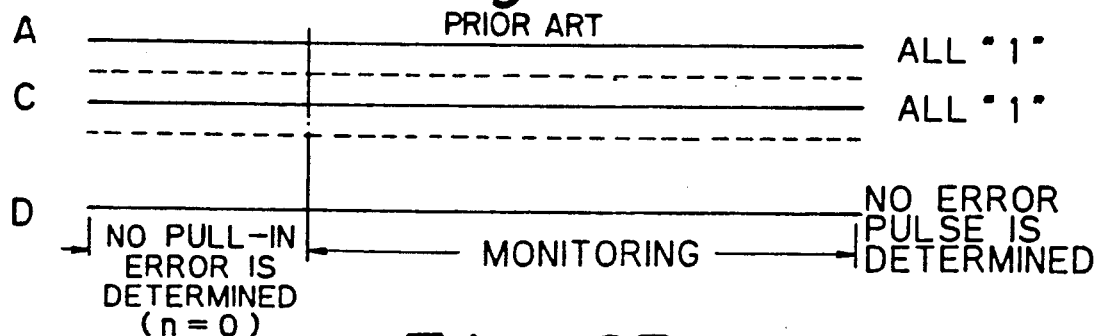
FIGS. 6A to 6D are timing diagrams of the operation of the circuits of FIGS. 1 to 3 when an alarm indication signal AIS is successively input from the transmission line 57.
Figure 6B:
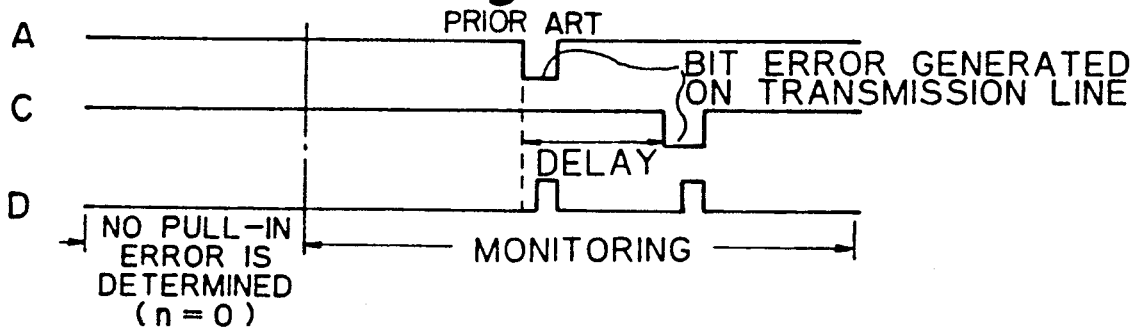
Figure 6C:
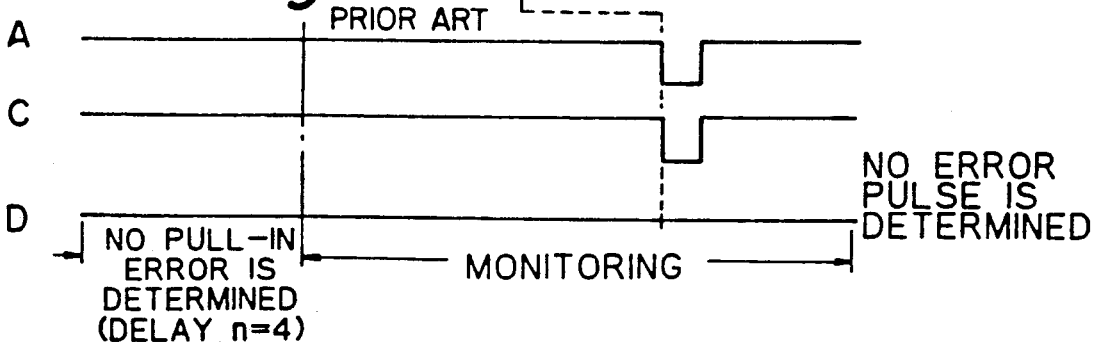
Figure 6D:
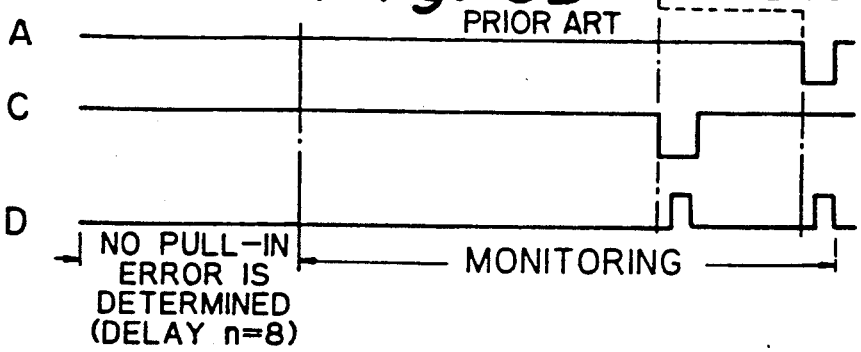
Figure 7:
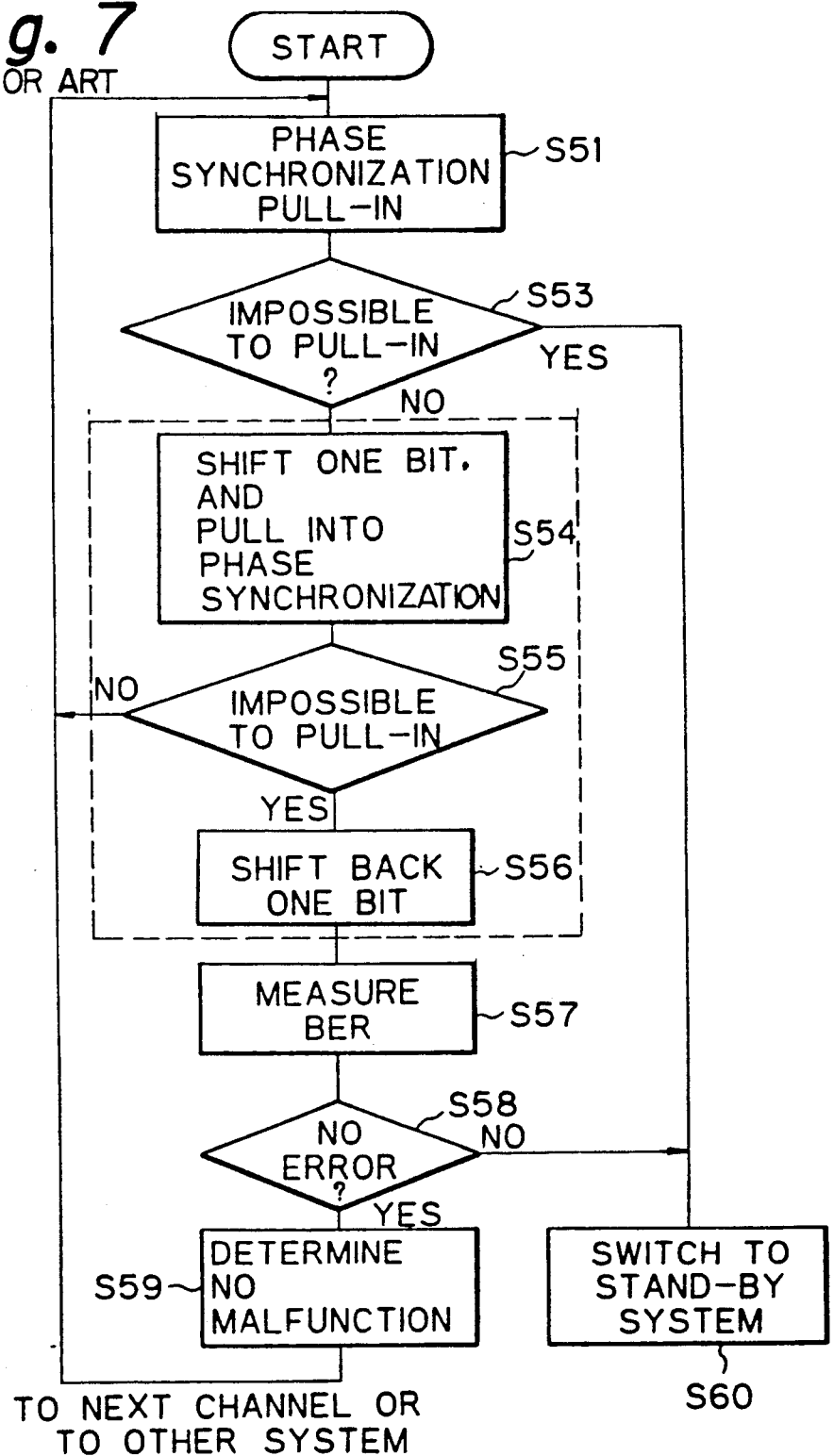
FIG. 7 is a flow chart of a conventional control procedure of the controller 56 for phase synchronization pull-in and bit error detection.

In FIGS. 10A and 10B, the same reference numerals used in FIG. 1 each denote the same component. In the controller 56', reference numeral 11 denotes a delay time setting circuit for setting a delay time in the variable delay circuit 65, 12 denotes a bit error counting circuit for counting the number of the bit error pulses, 13 denotes a pull-in number counting circuit for counting the number k of successful pull-in's, 14 denotes an m>MAX detecting circuit, 15 denotes a delay time memory for storing the delay time in the variable delay circuit 65, 16 denotes a k=0 detecting circuit, 17 denotes a k≧1 detecting circuit, 18 denotes a k=1 detecting circuit, and 19 denotes a k≧2 detecting circuit.

The delay time setting circuit 11 sets a delay time in the variable delay circuit 65 by a select signal which contains information on the number m (m=0−n) of the input terminal of the selector 71, i.e., outputs a select signal which controls the selector 71 to select the m-th input as its output.

The bit error counting circuit 12 counts the number of the bit error pulses from the bit error detecting circuit 55 for a predetermined time to obtain a bit error rate BER1. When the count does not exceed a predetermined number which corresponds to a threshold value Th1 for the bit error rate BER1, the bit error counting circuit 12 outputs a signal indicating a success of the phase synchronization pull-in operation. When the count exceeds the predetermined number corresponding to Th1, the bit error counting circuit 12 outputs a signal indicating a failure in the phase synchronization pull-in operation.

The pull-in counting circuit 13 counts the number k of successful pull-in's using the above signal from the bit error counting circuit 12.

The m>MAX detecting circuit 14 outputs a control signal to the k=0 detecting circuit 16, the k=1 detecting circuit 18, and the k≧2 detecting circuit 19. The m>MAX detecting circuit 14 also outputs a reset signal to the delay time setting circuit 11 when the above number m from the delay time setting circuit 11 exceeds its maximum number n.

The delay time memory 15 stores the delay time in the variable delay circuit 65 when the phase synchronization pull-in succeeds with the delay time.

The k=0 detecting circuit 16, the k=1 detecting circuit 18, and the k≧2 detecting circuit 19, each receive as inputs the output of the pull in number counting circuit 13 when the above control signal from the m>MAX detecting circuit 14 is applied thereto, and output an active signal when the number k is 0, 1, and 2 or more, respectively. The active output signal from the k=0 detecting circuit 16 indicates an occurrence of a bit matching error which is determined based on impossibility of the phase synchronization pull-in operation. The active output signal from the k=1 detecting circuit 18 indicates that a determination of a delay time and setting thereof are successfully completed. The active output signal from the k≧2 detecting circuit 19 indicates that it is impossible to determine a correct delay time because more than one phase synchronization pull-in's succeed, i.e., the correct delay time value is indefinite.

The k≧1 detecting circuit 17 outputs an active write control signal to the delay time memory 15 to store the output number m from the delay time setting circuit 11 in the delay time memory 15. Each of the detecting circuits 16, 17, 18 and 19 can be realized by a decoder.

Figure 11:
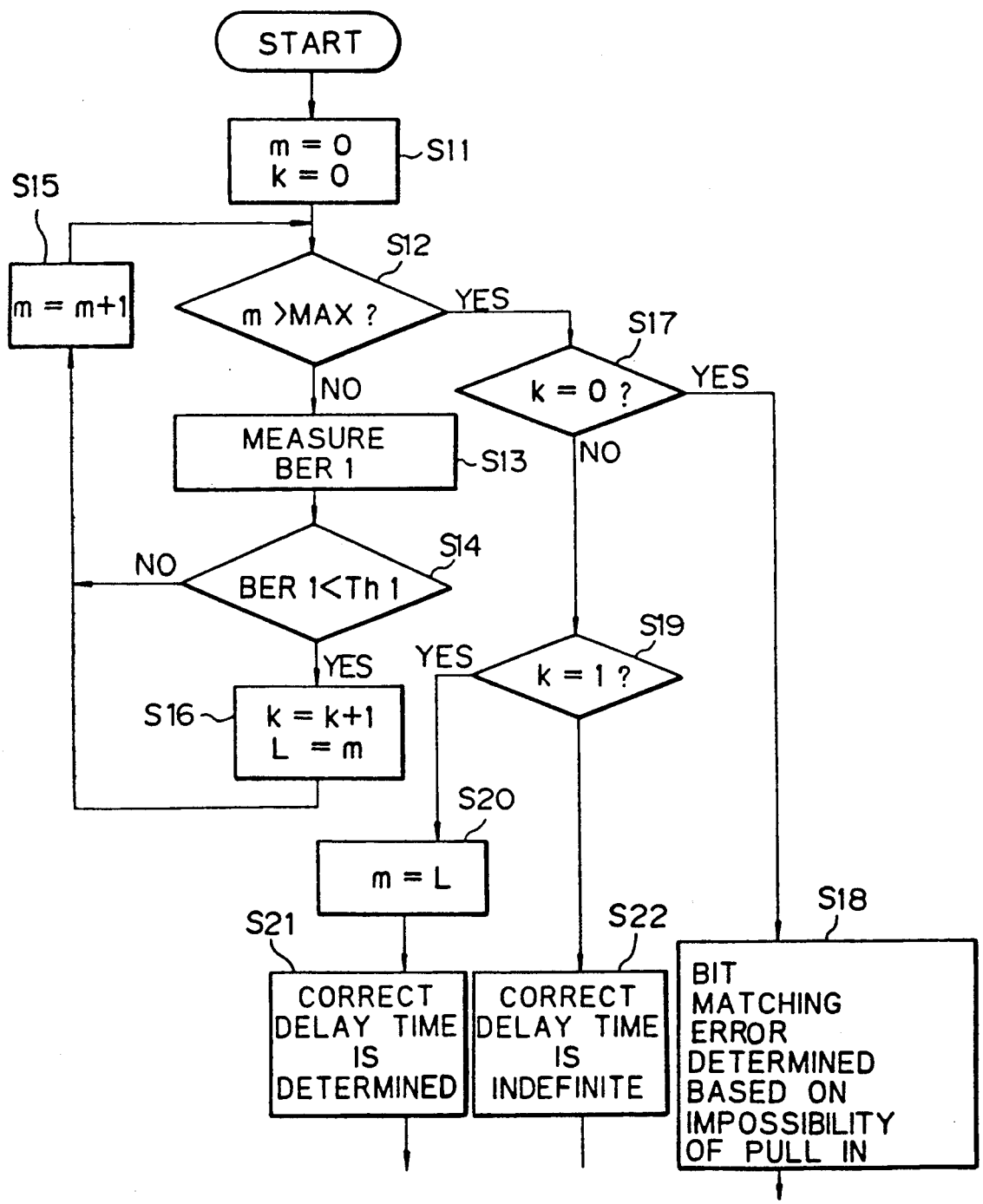
FIG. 11 is a flow chart of a control procedure in the first embodiment of the present invention.

FIG. 11 is a flow chart of a control procedure according to the first embodiment of the present invention.

In the step S11 of FIG. 11, the above number m in the delay time setting circuit 11 and the number k in the pull-in number counting circuit 13 are initialized to zero.

In the step S12, in the m>MAX detecting circuit 14, it is determined whether or not the above number m from the delay time setting circuit 11 exceeds its maximum number n. When it is determined NO, the operation goes to the step S13, and the bit error rate BER1 is measured in the bit error counting circuit 12.

In the step S14, it is determined whether or not the bit error rate BER1 is smaller than the threshold value Th1 (for example, $10^{-3}$). When it is determined that the bit error rate BER1 is smaller than the threshold value Th1, it is determined that phase synchronization pull-in for the delay time succeeds, and in the step S16, the pull-in number counting circuit 13 increments its count as k→k+1. Accordingly, the k≧1 detecting circuit 17 outputs a memory write control signal to the delay time memory 15 to store the number m in the delay time memory 15, in the step S16. Then, the operation goes to the step S15.

When it is determined that the bit error rate BER1 is not smaller than the threshold value Th1 in the step S14, the operation goes to the step S15.

In the step S15, the number m in the delay time setting circuit 11 is incremented as m→m+1, and then the operation goes to the step S12.

When it is determined that the above number m from the delay time setting circuit 11 exceeds its maximum number n in the step S12, the operation goes to the step S17, and it is determined whether or not the number k from the pull-in number counting circuit 13 is zero, in the k=0 detecting circuit 16. When it is determined k=0, the operation goes to the step S18, and an occurrence of a bit matching error is determined based on the impossibility of the phase synchronization pull-in operation. In this case, the circuit which is currently in operation and is monitored, is switched to the stand-by circuit for the monitored circuit.

When it is determined that the number k is not zero in the step S17, the operation goes to the step S19, and it is determined whether or not the number k from the pull-in number counting circuit 13 is equal to one. When it is determined k=1, the delay time setting signal from the k=1 detecting circuit 18, and the memorized number m from the delay time memory 15, are output to the delay time setting circuit 11. The number m for which only the phase synchronization pull in succeeds, is set in the delay time setting circuit 11 to be used for the following monitoring operation. At the same time, in the step S21, it is determined that a correct delay time is determined and is set in the variable delay circuit 65.

When it is determined that the number k is not equal to one in the step S19, i.e., k≧1, the operation goes to the step S22, and it is determined in the status detecting circuit 21, that a determination of a correct delay time is impossible because more than one phase synchronization pull-in succeeds. That is, it is conjectured that a recurring signal consisting of a cyclic pattern is included in the input signal of the circuit being monitored. Thus, the following monitoring operation is not carried out using the indefinite delay time, and a monitoring operation using an incorrect delay time setting which is different from a correct value, can be avoided. In this case, for example, an input signal to the monitored circuit is switched to another channel when the monitored circuit is a multiplexer, and then the phase synchronization pull in operation is repeated for the channel.

Figure 12:
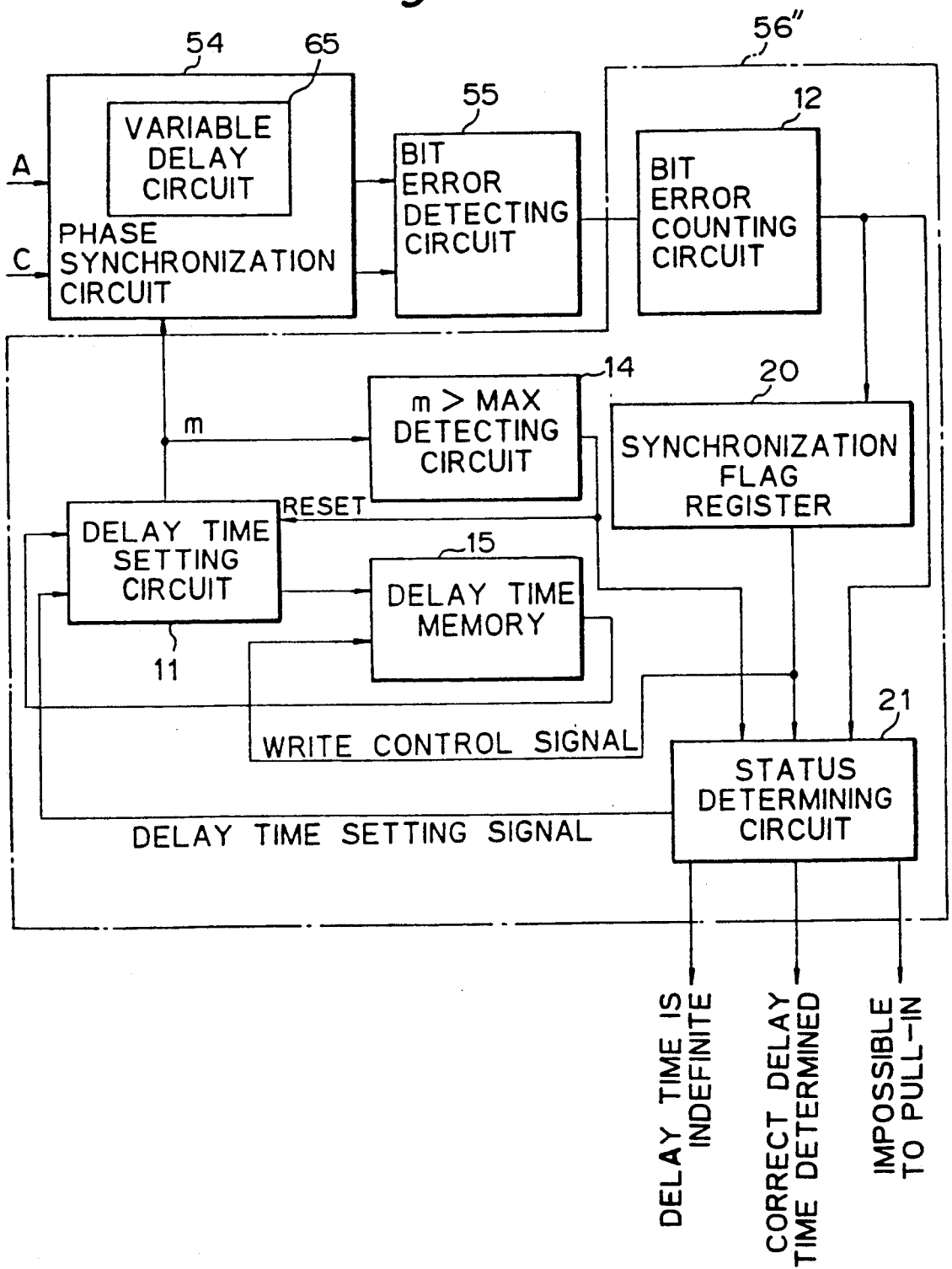
FIG. 12 is a block diagram of the controller 56'' in the bit matching circuit 53 according to a second embodiment of the present invention.

The second embodiment of the present invention is explained below. FIG. 12 is a block diagram of the controller 56" according to the bit matching circuit 53 in the second embodiment of the present invention.

In FIG. 12, the same reference numerals as FIGS. 10A and 10B each denote the same component. In the controller 56", reference numeral 20 denotes a synchronization flag register for indicating that at least one phase synchronization pull-in succeeds, and 21 denotes a status determining circuit.

The synchronization flag register 20 indicates that a phase synchronization pull-in succeeds for at least one delay time value. The output of the synchronization flag register 20 is applied to the delay time memory 15 as a memory write signal, and to the status determining circuit 21 to be used for status determinations therein. The outputs of the bit error counting circuit 12 and the output of the m>MAX determining circuit 14 are also applied to the status determining circuit 21 for the determinations. The status detecting circuit 21 determines the result of the phase synchronization pull-in operation based on these inputs as explained below, and outputs a delay time setting signal to the delay time setting circuit 11 when a correct delay tim is determined.

FIG. 13 is a flow chart of a control procedure in the second embodiment of the present invention.

In the step S31 of FIG. 13, the above number m in the delay time setting circuit 11 and the number k in the pull-in number counting circuit 13 are initialized to zero.

In the step S32, in the m>MAX detecting circuit 14, it is determined whether or not the above number m from the delay time setting circuit 11 exceeds its maximum number n. When it is determined NO, the operation goes to the step S33, and the bit error rate BER1 is measured in the bit error counting circuit 12.

In the step S34, it is determined whether or not the bit error rate BER1 is smaller than the threshold value Th1 (for example, $10^{-3}$). When it is determined that the bit error rate BER1 is smaller than the threshold value Th1, it is determined that phase synchronization pull-in for the delay time succeeds. In the step S36, it is determined whether or not the synchronization flag register 20 is already set. When step S36 determines that YES the flag register 20 is set, the synchronization flag register 20 is set to "1", and the delay time is stored in the delay time memory 15 by an active write control signal from the synchronization flag register 20, in the step S37. Then, the operation goes to the step S35.

When it is determined that the bit error rate BER1 is not smaller than the threshold value Th1 in the step S34, the operation goes to the step S35.

In the step S35, the number m in the delay time setting circuit 11 is incremented as m→m+1, and then the operation goes to the step S32.

When it is determined that the above number m from the delay time setting circuit 11 exceeds its maximum number n in the step S32, the operation goes to the step S38, and it is determined whether or not the synchronization flag register 20 is already set. When step S38 determines that NO the flag register 20 is not set, the operation goes to the step S39, and an occurrence of a bit matching error is determined in the status detecting circuit 21, based on the impossibility of the phase synchronization pull-in operation. In this case, the circuit which is currently in operation and is monitored, is switched to the stand-by circuit for the monitored circuit.

When it is determined that the synchronization flag register 20 is set in the step S38, the operation goes to the step S40, and the status determining circuit 21 determines that the delay time is correct. At the same time, the status determining circuit 21 outputs the delay time setting signal to the delay time setting circuit 11, and the memorized number m from the delay time memory 15 is output to the delay time setting circuit 11. Thus, the number m for which only the phase synchronization pull-in succeeds, is set in the delay time setting circuit 11 to be used for the following monitoring operation.

When it is determined that the synchronization flag register 20 is already set in the step S36, the operation goes to the step S41, and it is determined in the status detecting circuit 21 that a determination of a correct delay time is impossible because more than one phase synchronization pull-in succeeds. That is, it is conjectured that a recurring signal consisting of a cyclic pattern is included in the input signal of the circuit being monitored. Thus, the following monitoring operation is not carried out using the indefinite delay time, and a monitoring operation using an incorrect delay time setting which is different from a correct value, can be avoided. In this case, for example, an input signal to the monitored circuit is switched to another channel when the monitored circuit is a multiplexer. Then the phase synchronization pull-in operation is repeated for the channel.

As explained above, according to the second embodiment of the present invention, the phase synchronization pull-in operation may be completed in a shorter time than the first embodiment of the present invention.

We claim:

1. A phase synchronization pull-in system which is used in a bit error detecting apparatus, comprising:
    a monitored circuit for inputting an input signal, and processing said input signal, when an operation of said monitored circuit is to be monitored;
    a standard circuit, operatively connected to said monitored circuit for inversely processing an output of said monitored circuit with respect to the processing in said monitored circuit;
    a phase synchronization circuit, operatively connected to said monitored circuit, including a variable delay circuit for inputting said input signal of said monitored circuit, and adjusting a first delay time of the input signal so that the first delay time coincides with a second delay time of the output of said standard circuit corresponding to the input signal, the second delay time is obtained by inputting the input signal through said monitored circuit and said standard circuit;
    a bit error detecting circuit, operatively connected to said phase synchronization circuit and said variable delay circuit, for detecting a difference between said input signal after being delayed by said variable delay circuit, and the output of said standard circuit, bit by bit; and
    a controller, operatively connected to said phase synchronization circuit and said bit error detecting circuit, for controlling said adjusting of said first delay time, a monitoring operation of said monitored circuit, and a phase synchronization pull-in operation, using said phase synchronization circuit and said bit error detecting circuit, said phase synchronization pull-in operation is an operation for obtaining said first delay time which coincides with said second delay time output from said standard circuit corresponding to the input signal in said phase synchronization circuit, based on whether a bit error rate measured by setting the delay time is higher than a predetermined value;

said first delay time of said phase synchronization circuit being changed within a predetermined range between a maximum delay value which is larger than an estimated maximum amount of said second delay time, and a minimum delay value which is less than an estimated minimum amount of said second delay time; and during said phase synchronization pull-in operation, said controller determines whether more than one of all possible values of said first delay time enables a successful phase synchronization pull-in, and carries out said monitoring operation when a successful phase synchronization pull-in is successfully carried out for only one of all possible values of said first delay time.

2. A phase synchronization pull-in system according to claim 1, wherein said phase synchronization circuit comprises:

a fixed delay circuit for delaying said input signal by a delay time which is less than an estimated minimum amount of said second delay time; and a variable delay circuit, operatively connected to said fixed delay circuit, for delaying the input signal by an additional amount of time, wherein said additional amount of time can be changed by an amount of time corresponding to one bit of said input signal within said predetermined range.

3. A phase synchronization pull-in system according to claim 1, wherein during said phase synchronization pull-in operation, said controller tries the phase synchronization pull-in operation for all possible values of said first delay time, and then determines whether more than one of all possible values of said first delay time enables a phase synchronization pull-in.

4. A phase synchronization pull-in system according to claim 1, wherein said controller determines that said phase synchronization pull-in operation can not be performed for said input signal when more than one among all possible values of said first delay time enables a phase synchronization pull-in.

5. A phase synchronization pull-in system, according to claim 1, wherein said predetermined range in said phase synchronization circuit is predetermined to be greater than a probable maximum recurring cycle of said input signal.

6. A phase synchronization pull-in system according to claim 1, wherein said phase synchronization circuit continues to adjusts the phase of each bit of the output signal of said standard circuit with a clock signal which is extracted from said input signal.

7. A phase synchronization pull-in system according to claim 1, wherein during said phase synchronization pull-in operation, said controller executes phase synchronization pull-in for one of all possible values of said first delay time, and then repeats the same for other values of all possible values of said first delay time, until a phase synchronization pull-in is performed for two of all possible values of said first delay time, or until a phase synchronization pull-in is carried out for all possible values of said first delay time.

8. A phase synchronization pull-in system according to claim 1, wherein, said controller determines that said phase synchronization pull-in operation can not be performed for said input signal when more than one value all possible values of said first delay time enables a phase synchronization pull-in.

9. A phase synchronization pull-in system according to claim 1, wherein said phase synchronization circuit continues to adjust the phase of each bit of the output signal of said standard circuit with a clock signal which is extracted from said input signal.

10. A phase synchronization pull-in system according to claim 1, wherein said predetermined range in said phase synchronization circuit is predetermined to be greater than a probable maximum recurring cycle of said input signal.

* * * * *